United States Patent [19]

Schneider et al.

[11] Patent Number: 5,269,368

[45] Date of Patent: Dec. 14, 1993

[54] RECHARGEABLE TEMPERATURE REGULATING DEVICE FOR CONTROLLING THE TEMPERATURE OF A BEVERAGE OR OTHER OBJECT

[75] Inventors: Bernardus J. J. A. Schneider, Delfgauw; Ferdinand K. Steup, Noordwijk; Bernardus J. M. Schneider, Rijswijk; Hugo A. G. Macek, Berghem, all of Netherlands

[73] Assignee: Vacu Products B.V., Delft, Netherlands

[21] Appl. No.: 740,284

[22] Filed: Aug. 5, 1991

[51] Int. Cl.⁵ ............................................. F25D 3/00
[52] U.S. Cl. ...................................... 165/46; 165/135; 62/372; 62/530
[58] Field of Search ............... 62/530, 372; 165/10, 165/46, 135; 128/403

[56] References Cited

U.S. PATENT DOCUMENTS

| | | | |
|---|---|---|---|
| 2,438,643 | 3/1948 | Moore | 62/1 |
| 3,545,230 | 12/1970 | Morse | 62/530 |
| 3,804,077 | 4/1974 | Williams | 126/263 |
| 3,885,403 | 5/1975 | Spencer | 62/530 |
| 4,576,169 | 3/1986 | Williams | 62/530 |
| 4,700,706 | 10/1987 | Munch | 128/403 |
| 4,768,354 | 9/1988 | Barnwell | 62/457 |
| 4,886,063 | 12/1989 | Crews | 62/530 |
| 4,908,248 | 3/1990 | Nakashima et al. | 62/530 |
| 5,035,241 | 7/1991 | Walasek et al. | 128/403 |

FOREIGN PATENT DOCUMENTS

| | | |
|---|---|---|
| 0046894 | 7/1984 | European Pat. Off. |
| 0123949 | 11/1984 | European Pat. Off. |
| 0131439 | 1/1985 | European Pat. Off. |
| 0162583 | 11/1985 | European Pat. Off. |
| 0342927 | 11/1989 | European Pat. Off. |
| 04810 | 8/1986 | PCT Int'l Appl. |

Primary Examiner—Albert W. Davis, Jr.
Attorney, Agent, or Firm—Parmelee, Bollinger & Bramblett

[57] ABSTRACT

A reusable cooling and insulating device for bottles and the like is provided in the form of a jacket having a single or plurality of flexible compartments which are interconnected having an inner chamber and an outer chamber therein. A heating and cooling temperature conditionable liquid is housed in the inner chamber which enables the inner diameter of the jacket formed by the inner chamber to confirm with the surface of the object on the which the jacket is positioned for heating or cooling. A flexible insulator of air or air and flexible plastic is positioned in the outer chamber of each compartment for directing a greater temperature transfer from liquid to the object and less heat exchange from the liquid to the environment. The liquid is continuously in direct contact with and pressed upon the bottle or object which contact determines the cooling/heating. The jacket is recharged in a freezer or heated in a microwave depending on the function to be performed. The liquid is never frozen solid in order to conform to the shape of the object to which the device is applied.

19 Claims, 1 Drawing Sheet

RECHARGEABLE TEMPERATURE REGULATING DEVICE FOR CONTROLLING THE TEMPERATURE OF A BEVERAGE OR OTHER OBJECT

BACKGROUND OF THE INVENTION

This invention relates to a flexible heating and cooling device which takes the shape of the object on which it is positioned, and more particularly to a reusable, rechargeable temperature regulating jacket containing a temperature conditioning liquid for controlling the temperature of a beverage container or other object on which the jacket is positioned.

A variety of products are currently available which may be utilized as portable heating and cooling devices, for example water bottles which may be filled with ice or hot water dependent on the function which is to be performed. Other types of temperature controlled media which had been used are essentially water or water/alcohol mixtures which are packaged in rigid or plastic containers. Some are actually in the form of beverage container holders which are used for chilling and insulating canned or bottled beverages, for example, as shown in U.S. Pat. Nos. 4,768,354; 4,163,374; 4,163,226; 3,302,427; and 4,299,100 and many others which contain cooling fluids. Such containers are usually rigid or semi-rigid and accommodate the housing of a particular size bottle or can. If different sized bottles or cans are used, such containers do not fit and good thermal contact is not established between the housed beverage can or bottle and the container which is used to chill it. Without such intimate contact good thermal temperature transfer is not made.

Another form of heating and cooling device employs a flexible plastic bag containing a liquid or gel which maintains a gel-like consistency over a wide temperature range in which gel is non-toxic and non-irritating. U.S. Pat. Nos. 3,545,230 and 3,885,403 are examples of this type of package. Another type of hot and cold pack is provided with materials being normally separated from each other in separate compartments in which the materials are mixed to produce a chemical reaction between the materials when one of the compartments is ruptured. Examples of this type of hot or cold compress are U.S. Pat. Nos. 3,804,077 and European Patent Application No. 89304933.8. Such packages generally come in a flat layer which must be configured or wrapped around the bottle, can or object which is desired to be heated or cooled. All such packages are adapted to be housed in a freezer of a refrigerator to be charged or readied for cooling purposes. Likewise, the device must be heated in some way when being used as a hot compress. When the packs are designed to be frozen in a refrigerator such devices are only suitable for things like portable coolers, insulated containers, etc. because the product is rigid and does not conform to the geometric configuration of the objects which are being cooled or heated thereby. Accordingly, uneven cooling is provided. One advantage of the gel packs resides in their flexibility and moldability when frozen. Thus, even moldable packs when frozen can be made to conform to various geometric shapes but retaining those shapes and keeping those shapes in intimate contact with the object being heated or cooled is simply not obtained. Direct intimate contact produces the best temperature exchange and any deviation in such contact produces poorer results in terms of heat or temperature exchange. At the same time, such packs are not insulated from the environment, and accordingly transfer as much or more temperature to the environment than to the object to which they are affixed. This is partly due to the fact that larger surface areas communicate with the environment rather than with the object being cooled, particularly when the cooling or heating appliance loses direct intimate contact with that object.

SUMMARY OF THE INVENTION

Accordingly, it is the object of this invention to provide a new and improved rechargeable temperature regulating device for altering the temperature of an object on which the device is positioned which is an easy to use reusable cooling and insulating device for containers such as bottles, cans and the like.

Still another object of this invention is to provide a rechargeable temperature regulating device which is continuously in direct contact with and pressed upon the object being heated or cooled with the amount of direct contact determining the time and extent of cooling or heating.

Another object of the present invention is to provide a rechargeable temperature regulating device which may be charged for cooling in the refrigerator or freezer and charged for heating in a microwave or other heating media.

Yet another object of the present invention is to provide a rechargeable temperature regulating jacket of simple construction which is usable on a great variety of bottles and cans of different diameters and which may be fabricated to accommodate special sized containers having irregular shapes and different diameters.

Another object of the present invention is to provide a rechargeable temperature regulating jacket in which the maximum temperature exchange occurs toward the object on which the jacket is mounted while at the same time deterring heat transfer to the environment.

A further object to this invention is to provide a temperature regulating jacket which is adjustable for fitting different size objects.

Yet another object of this invention is to provide a new and improved reusable, rechargeable temperature regulating sleeve which is easily applied or removed from a bottle and which will not slide off of a bottle when the bottle is picked up by a portion extending outside the coverage of the sleeve.

Yet another object of the present invention is to provide a new and improved reusable, rechargeable regulating jacket which includes a temperature transfer liquid which is reusable, nontoxic and covers a wide temperature range, will not freeze in the freezer and will withstand high temperatures when used as a heating device.

Still another objection of the present invention is to provide a reusable, rechargeable temperature regulating sleeve whose heating and cooling liquid will not freeze and therefore permits the sleeve to be squeezed, crammed and stored in small irregular spaces.

In carrying out this invention in one illustrative embodiment thereof, a rechargeable temperature regulating jacket is provided for altering the temperature of an object on which the jacket is positioned. The jacket, in the form of a hollow cylinder, has at least one flexible compartment. The compartment has an inner chamber and an outer chamber. A heating and cooling liquid in the inner chamber of the compartment enables the inner diameter of the jacket formed by the inner chamber to conform with the surface of the object on which the jacket is positioned. A flexible insulating means is positioned in the outer chamber of each compartment for directing greater temperature transfer from the heating and cooling liquid on which the jacket is positioned and less heat exchange from the liquid to the environment.

BRIEF DESCRIPTION OF THE DRAWINGS

The invention, together with further aspects, objects, features and advantages thereof will be more clearly understood from the following description taken in connection with the accompanying drawings.

DESCRIPTION OF THE PREFERRED EMBODIMENT

Figure 1:
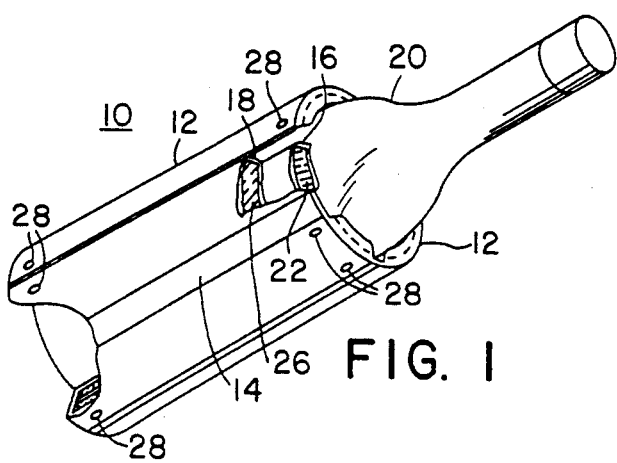
FIG. 1 is a perspective view of the rechargeable temperature regulating device partly broken away and partly in section illustrating the device mounted on a bottle whose temperature is desired to be controlled.
Figure 2:
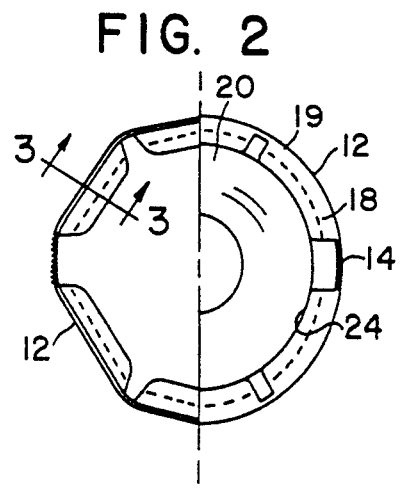
FIG. 2 is a top plan view of the temperature regulating device shown in FIG. 1, half of which is illustrated when not in use and the other half being illustrated as being mounted on the bottle as illustrated in FIG. 1.
Figure 3:
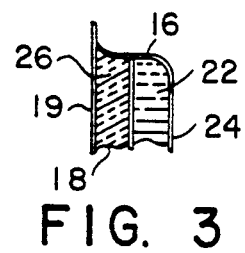
FIG. 3 is a partial side elevation, cross-sectional view taken along line 3—3 of FIG. 2.

Referring now to FIGS. 1, 2, and 3, a jacket, referred to generally with reference numeral (10) is comprised of a plurality of compartments (12) which are interconnected by a bendable connector (14). The compartments (12) are made of a thermo-plastic film such as polyethylene, polypropylene, polyethylene terephthalate, or the like which are flexible as well as tear, temperature and puncture resistant. The bendable connector (14) in one form is made as the same material as the compartments (12) for those applications where the jacket (10) is configured to fit a specific diameter container such as the bottle (20) illustrated in FIG. 1. In those cases where it is desired to adapt the jacket (10) to fit many sizes of containers such as bottles (20) having different diameters, the coupling means (14) may be in the form of a suitable elastic material which is preferably provided on opposite sides of the jacket (10) thus displaced 180 degrees from each other in order to provide an elastic sleeve which will fit several types and different diameter containers (20).

The compartments (12) as will thus be seen in FIGS. 1 and 3 have an inner chamber (16) and an outer chamber (18). The inner chamber (16) is filled with a heating and cooling liquid (22) which has a low freezing point and/or a high boiling point and is also non-toxic. Preferably, the liquid will be in the form of a gel which maintains a gel-like consistency over a wide temperature range and may consist of a combination of propyleneglycol in combination with water, a thickening agent and possibly a coloring agent for esthetic purposes. One formulation which has been found useful over a wide temperature range is described in U.S. Pat. No. 3,885,403 but it will be understood that the invention is not considered limited to such a liquid as there are already many known alternatives. The desired characteristic of the heating and cooling liquid is that the liquid will not totally freeze when the jacket (10) is placed in the freezer. In preferable form, the heating and cooling liquid will have a chunky consistency when frozen and will cover a lower temperature range of from −7° C. to possibly −35° C. depending on the freezer in which the jacket is placed for conditioning. Since the liquid (22) will not freeze the jacket, will conform to the shape of a bottle when placed thereon and the jacket (10) can be squeezed, layered or otherwise crammed in limited areas for storage in small irregular spaces in a freezer compartment or in other places when not in use.

The cooling and heating inner chamber (16) contains liquid (22). The inner chamber (16) and its liquid contents enables each inner chamber (16) to intimately contact and conform with the shape of the bottle (20). With this arrangement, the inner chamber (16) is quite flexible having an inner wall (24) which contacts the bottle (20) permitting the inner wall (24) to conform to the shape of the outer diameter of the bottle (20).

The outer chamber (18) has an outer wall (19) and houses an insulating medium (26) which is flexible and can be squeezed, e.g. air and/or polyester foam. Holes (28) (see FIG. 5) may be provided in the outer wall (19) of the outer chamber (18) to allow air to flow in and out of the outer chamber (18) in order to enhance the flexibility of the outer chamber. The outer wall (19) of the outer chamber (18) determines the maximum diameter that can be covered by the jacket (10). If the outer wall (19) is made of an elastic insulating material, some more variation will thus be provided.

In describing the operation, it will be assumed for explanatory purposes that the jacket (10) will be employed for a cooling operation and specifically will be applied on a bottle (20) for cooling its contents. First the jacket (10) is stored in a refrigerator or freezer depending on the amount of cooling desired, and then is placed over the bottle (20) as shown in FIG. 1. The cooling liquid (22) in the inner chamber (16) is squeezed or distributed in the inner chamber (16) into intimate contact with the bottle (20), thereby applying pressure against the insulating medium (26) in the outer chamber (18). The insulating medium (26) in turn is flattened due to the holes (28) in the outer wall (19) of the outer chamber (18) releasing air therefrom and producing a counter pressure on the inner chamber. Since the outside diameter of the jacket (10) does not change, the cooling liquid (22) in the inner chamber (16) forces the wall (24) against the outer diameter of the bottle (20), as will be seen in the right hand side of FIG. 2 due to the counter pressure exerted by the outer chamber.

In certain applications, the bendable connector (14) will simply be of the same material, namely flexible plastic, as are the inner and outer chambers (16) and (18). On the other hand, as illustrated in FIG. 1, the bendable connectors (14) can comprise stretch materials such as elastic, rubbers (either horizontal or vertical) or thermal plastic rubbers, which will permit the jacket of the present invention to be usable on a larger range of diameters. Accordingly, since many wine bottles, beer bottles, soda cans or beer cans or other beverage containers have a standard size, the jacket of the present invention having one or more compartments can be fabricated for a standard size to cover specific applications or can be made elastic to accommodate a greater range of sizes.

The same operation would take place when the jacket is used in a heating mode, e.g. for warming baby bottles and other food items. The jacket would first be heated in a microwave or by any other suitable means, and then applied to the object which is to be heated.

In either the heating or cooling mode, it will be apparent that the compartments (12) of the jacket (10) and particularly the inner chamber (16) containing the heating or cooling liquid (22) are held continuously in direct contact and pressed upon the bottle or container (20) on which the jacket is mounted. This firm, direct contact determines the cooling or heating period. Firm contact is achieved because the inner chamber (16) contains a liquid which at best remains chunky and not solid when stored in a freezer compartment of a refrigerator and the outer chamber (18) has a flexible insulating medium as well as holes in the outer wall (19) of the chamber. Both the inner and outer chambers have flexibility and the looser the compartments (12) remain when pressed against the bottle (20) the longer the cooling period. Since the heating or cooling liquid (22) is reusable, it may be recharged simply by storing the jacket (10) in the freezer, the refrigerator or any cooling environment or heating by any suitable means such as a microwave. Since the liquid (22) does not freeze solid, the compartments (12) of the jacket (10) will take the shape of the bottle (20) which causes maximum contact in combination with pressure from the outer environment.

As pointed out, the flexibility of the inner chamber (16) with the contents of a non-freezable liquid (22) along with flexibility of the outer chamber (18) with an air carrying insulating medium (26) and an outer wall (19) having a maximum diameter, all combine to press the jacket into firm contact with the bottle. It should be pointed out that as greater pressure is exerted by the outer chamber on the inner chamber of the compartment that at some point the insulating effect of a flattened outer chamber may be lessened to the extent that further pressure would be non-productive for optimal heat exchange.

In the embodiment illustrated in FIG. 1, the jacket (10) is in the form of a sleeve which can be placed or removed from the bottle (20) simply by sliding it over the top of the bottle (20). With the flexibility of the compartments (12) of the jacket (10) the jacket will not slide off of the bottle (20) when the bottle is picked up by its neck. Since the jacket (10) is flexible the contents of the bottle may be easily poured with the jacket remaining in place on the bottle.

With respect to the outer wall (19) of the outer chamber (18 nylon may be utilized in combination with a flexible plastic to provide both strength and a better heat seal. Generally speaking, the inner wall (24) of the inner chamber (16) will be as thin as possible for maximum temperature transfer or exchange between the liquid (22) in the inner chamber (16) and the object such as the bottle (20). On the other hand, the outer wall (19) of the outer chamber (18) will be thicker than the inner wall (24) for both strength and insulation purposes. It will be apparent with the construction shown that the flexible insulating medium (26) in the outer chamber (18) positioned between the inner chamber (16) and the environment provides greater heat transferred from the liquid (22) to the object on which the jacket (10) is mounted than the heat transfer that takes place from the liquid (22) through the outer chamber (18) to the environment. By making the outer wall (19) thicker and the inner wall (24) thinner, the temperature change or transfer just described will be enhanced.

The embodiment of FIG. 1 illustrates the use of six compartments (12) but it should be understood that the jacket of the present invention is not limited in the number of compartments utilized, as only one may be employed. However, it is preferable to use an even number of compartments (12) so that the jacket (10) can be stored flat either in the refrigerator freezer compartment or for general storage. However, the number of compartments which are utilized will depend also on the use of the jacket as well as whether a heating or cooling function is desired for a particular application and the type of object which is to be heated or cooled.

Figure 4:
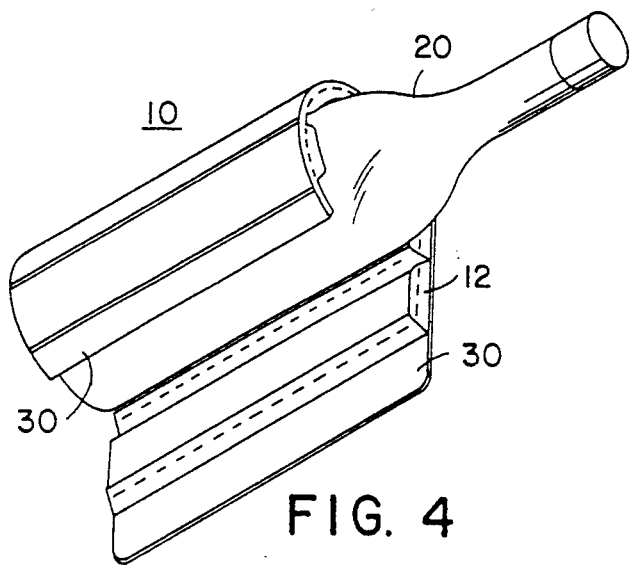
FIG. 4 is a perspective view of another embodiment of the rechargeable temperature regulating sleeve or jacket shown in FIG. 1 which includes an adjustable, releasable fastening means for mounting the temperature regulating device on different sized bottles.

FIG. 4 illustrates another embodiment in which VELCRO strips (30) replace one of the bendable connectors (14) for interconnecting the compartments (12). The use of the VELCRO strips provide an adjustable means whereby the jacket (10) may be utilized on a variety of objects as well as the same type of objects having different diameters. This particular application would be good for odd shaped containers or objects, for example, in the medical field where a sleeve or jacket would not necessarily slip on or fit properly. With the VELCRO approach as illustrated in FIG. 4 the jacket (10) may be wrapped around, for example, the knee where it otherwise may be difficult to slide on. The intimate contact as well as being able to affix the jacket on an injured part of the body is believed very advantageous over the use of a cold or hot compress which must be held in place by the user.

Figure 5:
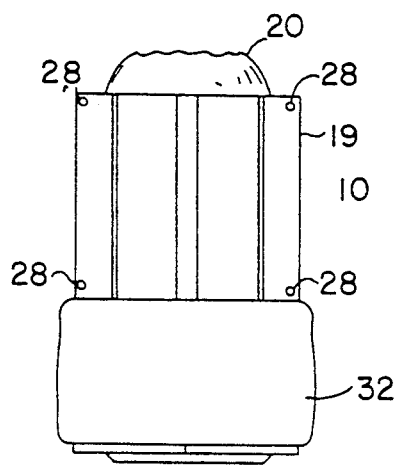
FIG. 5 is a side elevational view of FIG. 1 illustrating the use of a sweat band for absorbing moisture on the sleeve illustrated in FIG. 1.

In the embodiment of FIG. 5 an elastic sweat band (32) is positioned on the outer wall (19) of the jacket (10) to absorb any moisture which may condense off of the bottle or the jacket (10). The sweat band (32) may be attached to and form a part of the outer wall or may be applied separately. As a further alternative absorbent flaps (not shown) may be mounted on and extend from the bottoms of the compartments (12) and the bendable connectors (14).

Figure 6:
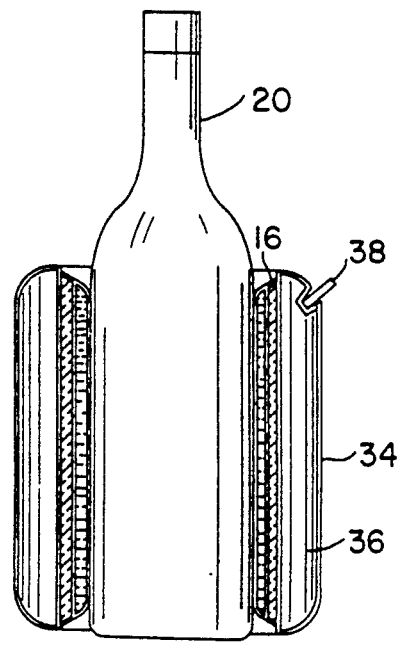
FIG. 6 is a side elevational view illustrating another embodiment of the temperature regulating device which is in section and shown mounted on a bottle wherein an outer insulating compartment comprises an inflatable air bag.

In the embodiment of FIG. 6 an air bag (34) may be provided where the insulating medium comprises air which is inserted in the air bag (34) through a valve (38). The air bag (34) can be used in place of the insulating medium (26) or can be used with it to provide further insulation if so desired. In this embodiment the air (36) and the air bag (34) will both insulate and apply pressure to the cooling liquid (22) against the bottle (20). Accordingly, the air bag would perform the same function as the outer chamber (18) but operates in a slightly different manner.

Accordingly, the heating and cooling jacket of the present invention is continually in direct intimate contact with and places pressure upon the object which is to be heated or cooled. The heating or cooling period can also be controlled by the manner in which the jacket contacts the object to be cooled. The less the elements are pressed against the object the longer the heating or cooling cycle. As pointed out, the jackets may be designed to fit a single diameter or outer shape of a container or maybe flexible to accommodate several different sizes. The heating or cooling liquid may be different colors for esthetic effect. By using transparent plastic walls for the compartments colored advertisements may be easily placed on the surfaces of the jacket.

As pointed out, the heating and cooling liquid (22) will be non-toxic and a distasteful taste may be provided to prevent humans from ingesting the liquid in case one of the inner chambers should fracture in use. If desired, temperature sensitive strips could be placed on the jackets that change color within a certain temperature range to provide an indication of the temperature being transferred to the object which is either being heated or cooled.

It will be apparent that many applications will lend themselves to utilization of this invention. Although the invention is particularly suited for cooling canned or bottled beverages, the invention could be utilized for keeping items warm and in medical applications for applying heating or cool compresses to an area of an injured victim.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A rechargeable temperature regulating device for altering the temperature of an object on which the device is positioned comprising:
    a jacket in the form of a hollow cylinder having at least one flexible compartment;
    a flexible liquid filled inner chamber and a flexible atmospheric communicating outer chamber in said compartment, said atmospheric communicating outer chamber having an outside wall with a predetermined maximum diameter;
    a temperature conditionable liquid which will not completely solidify when subjected to a predetermined temperature range below 32° F. in said liquid filled inner chamber of said compartment, enabling said inner chamber of the jacket to conform with the surface of the object on which said jacket is positioned; and
    a flexible insulating means in said atmospheric communicating outer chamber of said compartment which is pressed against said outside wall of said outer chamber when said jacket is positioned on an object whose temperature is to be altered thereby producing a counter force against said liquid in said inner chamber which firmly presses said inner chamber against the object while insulating the jacket surrounding portion of the object from the environment.

2. The temperature regulating device as claimed in claim 1 having at least one bendable connector of the same material used to connect said compartment to form said jacket.

3. The temperature regulating device as claimed in claim 2 wherein said bendable connector is solid.

4. The temperature regulating device as claimed in claim 2 wherein said bendable connector is elastic.

5. The temperature regulating device as claimed in claim 1 wherein said jacket has a plurality of flexible compartments separated by a plurality of bendable connectors.

6. The temperature regulating device as claimed in claim 1 wherein said outer chamber has an outer wall adapted to communicate with the environment and said inner chamber has a inner wall adapted to communicate with the object on which said jacket is positioned, said outer wall being thicker than said inner wall for encouraging greater temperature exchange between said liquid and the object than between said outer wall and the environment.

7. The temperature regulating device as claimed in claim 1 wherein said flexible insulating means comprises resilient air pervious plastic.

8. The temperature regulating device as claimed in claim 7 wherein said outer chamber has an outer wall with holes therein for enhancing the flexibility of said resilient air pervious plastic.

9. The temperature regulating device as claimed in claim 1 wherein said flexible insulating means comprises air.

10. The temperature regulating device as claimed in claim 2 wherein said bendable connector comprises a VELCRO fastener means mounted for interconnecting said compartment to form a sleeve.

11. The temperature regulating device as claimed in claim 1 having a sweat band positioned on said jacket for absorbing any moisture condensed thereon.

12. The temperature regulating device as claimed in claim 1 wherein said insulating means comprises air housed in an air bag surrounding said inner chamber.

13. The temperature regulating device as claimed in claim 7 having an air bag surrounding said compartments which is adapted to be inflated with air for providing additional insulation for said jacket.

14. A reusable, rechargeable temperature regulating device for altering the temperature of an object on which the device is positioned comprising:
    a jacket having a plurality of flexible compartments;
    a plurality of bendable connectors for interconnecting said compartments to form said jacket;
    each of said plurality of compartments having a flexible liquid filled inner chamber and a flexible atmospherically vented outer chamber therein;
    a temperature conditionable liquid in said liquid filled inner chamber of each of said compartments which will not become completely rigid when subjected to a predetermined temperature range below 32° F. thereby enabling the inner chambers of said jacket formed by the interconnected compartments to conform with the surface of the object on which said jacket is positioned, even when the jacket is subjected to freezing temperatures before being applied on the object; and
    means including a flexible insulating means positioned in said outer chamber of each compartment and said atmospherically venting for producing a counter force on said inner chamber when said jacket is positioned on an object whose temperature is to be altered whereby said inner chambers of said jacket are firmly pressed into thermal contact with the object on which said jacket is positioned.

15. The temperature regulating device as claimed in claim 14 wherein at least one of said bendable connectors is comprised of elastic material.

16. The temperature regulating device as claimed in claim 14 wherein at least one of said bendable connectors comprises a VELCRO fastening means.

17. The temperature regulating device as claimed in claim 14 in which said bendable connector comprises the same materials as said compartment.

18. The temperature regulating device as claimed in claim 14 wherein said flexible insulating means comprises air, said atmospherically vented chamber having at least one hole therein for enhancing the flexibility of said outer chamber.

19. The temperature regulating device as claimed in claim 18 wherein said flexible insulating means includes resilient air pervious plastic.

* * * * *